United States Patent
Hashimoto

(10) Patent No.: US 6,864,607 B2
(45) Date of Patent: Mar. 8, 2005

(54) DRIVING APPARATUS FOR VEHICLE

(75) Inventor: Takenori Hashimoto, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 96 days.

(21) Appl. No.: 10/414,045

(22) Filed: Apr. 16, 2003

(65) Prior Publication Data

US 2003/0196842 A1 Oct. 23, 2003

(30) Foreign Application Priority Data

Apr. 19, 2002 (JP) ........................ 2002-117076

(51) Int. Cl.⁷ .............................................. H02K 7/10
(52) U.S. Cl. ..................... 310/75 R; 310/75 C; 310/83; 180/65.1; 180/65.6
(58) Field of Search ........................... 310/75 R, 75 C, 310/75 D, 83; 180/65.1–65.8

(56) References Cited

U.S. PATENT DOCUMENTS 4,799,564 A * 1/1989 Iijima et al. ............... 180/65.5
4,913,258 A * 4/1990 Sakurai et al. .............. 180/242
6,276,481 B1 * 8/2001 Matsuto et al. ............. 180/220
6,604,591 B2 * 8/2003 Bowen et al. ............. 180/65.6

FOREIGN PATENT DOCUMENTS

JP 10-278603 10/1998
JP 11-98616 4/1999

* cited by examiner

Primary Examiner—Thanh Lam
(74) Attorney, Agent, or Firm—Smith, Gambrell & Russell

(57) ABSTRACT

A driving apparatus has a differential gear unit and an electric motor and drives drive wheels of a vehicle. The differential gear unit includes a differential case provided with a final driven gear, and two axle shafts respectively coupled to the drive wheels. A hollow rotor shaft is coaxially disposed outside one of the axle shafts, and a rotor of the electric motor is fixed to this rotor shaft. A reduction shaft is disposed in parallel to the axle shaft, and this reduction shaft is provided with a driven gear, which is engaged with a drive gear provided on the rotor shaft, and a final drive gear engaged with the final driven gear.

7 Claims, 4 Drawing Sheets

DRIVING APPARATUS FOR VEHICLE

BACKGROUND OF THE INVENTION

The present invention relates to a driving apparatus for vehicle, having an electric motor as a prime driving source (mover) for driving drive wheels.

An electric vehicle employs the electric motor, namely, a motor as a prime mover, and a hybrid vehicle is one employing the electric motor and an internal combustion engine as a prime mover. In such a vehicle equipped with the electric motor as the prime mover, there are employed a driving apparatus, which is provided with: an electric motor; a speed reduction mechanism for reducing speeds of its rotor shaft; and a differential gear unit, namely, a differential mechanism, for absorbing the difference in rotation between left and right drive wheels in turning the vehicle. The electric motor, the speed reduction mechanism and the differential gear unit are incorporated in a case, so that power of the electric motor is transmitted to the drive wheels through a drive shaft coupling the differential gear unit and the left and right drive wheels.

Examples of the driving apparatus used in the electric vehicle are disclosed in Japanese Patent Laid-open Nos. 10-278603 and 11-98616. The driving apparatus comprises: a rotor shaft concentric with a rotor of an electric motor; a reduction shaft provided with a first speed reduction gear train between this rotor shaft and another rotor shaft disposed in parallel thereto; and a differential gear unit provided with a final reduction driven gear, which is engaged with a final reduction drive gear fixed to the reduction shaft. The driving apparatus is therefore formed into a parallel three-shaft structure in which an axle shaft, the rotor shaft, and the reduction shaft are parallel to one another, the axle shaft being fixed to a bevel gear of the differential gear unit and coupled to a drive shaft.

SUMMARY OF THE INVENTION

Thus, in the conventional driving apparatus for a vehicle having the electric motor, three shafts parallel to one another are incorporated in its housing, whereby a size of the width direction of the driving apparatus, that is, a size of the radial direction of each shaft, is increased and the in-vehicle performance of the driving apparatus is deteriorated. Moreover, the driving apparatus needs to incorporate at least eight ball bearings including a ball bearing for supporting the rotor, whereby there has been a problem such that the structure of the driving apparatus becomes complicated.

An object of the present invention is to provide a driving apparatus for vehicle, which is small in size and excellent in-vehicle performance.

Another object of the present invention is to provide a driving apparatus having a two-shaft structure.

A driving apparatus for vehicle according to the present invention comprises: a differential gear unit having a differential case provided with a final reduction driven gear, and two axle shafts respectively coupled to drive wheels; the electric motor having a rotor fixed to a hollow rotor shaft that is coaxially disposed outside one of said axle shafts; and a reduction shaft disposed in parallel to said axle shafts, and provided with a driven gear that is engaged with a drive gear fixed to said rotor shaft and with a final reduction drive gear that is engaged with said final reduction driven gear.

The driving apparatus according to the present invention rotatably supports each of said differential case, said rotor shaft and said reduction shaft through two bearings in a unit case.

In the driving apparatus according to the present invention, said rotor shaft has: an inner hollow shaft provided with said drive gear; and an outer hollow shaft on which said rotor is mounted and that is formed integrally with said inner hollow shaft through a flange protruding outward and radially from the inner hollow shaft.

In the driving apparatus according to the present invention, the two bearings, supporting said rotor shaft, support said inner hollow shaft.

In the driving apparatus according to the present invention, one of the two bearings, supporting said rotor shaft, supports said inner hollow shaft, and the other supports said outer hollow shaft.

The driving apparatus according to the present invention spline-couples said drive gear onto said inner hollow shaft.

Finally, the driving apparatus according to the present invention forms said drive gear integrally with said inner hollow shaft.

The driving apparatus for vehicle according to the present invention has a two-shaft structure comprising the axle shaft with which the rotor of the electric motor is concentrically disposed and a reduction shaft disposed in parallel thereto, whereby the size of width of the driving apparatus is reduced and the miniaturization of the driving apparatus is achieved and the in-vehicle performance of the driving apparatus is improved. Use of the two-shaft structure also results in a reduction in the number of bearings, thereby allowing for manufacturing the driving apparatus at low costs.

DESCRIPTION OF THE PREFERRED EMBODIMENTS

A driving apparatus is mounted in an electric vehicle driving drive wheels only by electric power from a battery, or in a hybrid vehicle driving drive wheels by an internal combustion engine and an electric motor. For example, in the electric vehicle employing front wheels and rear wheels as drive wheels, two driving apparatus for front and rear wheels are respectively mounted on its vehicle. Meanwhile, in such a type of hybrid vehicle that its front wheels are driven by the internal combustion engine and its rear wheels are driven by the electric motor, the driving apparatus is mounted on its vehicle to drive the rear wheels.

Figure 1:
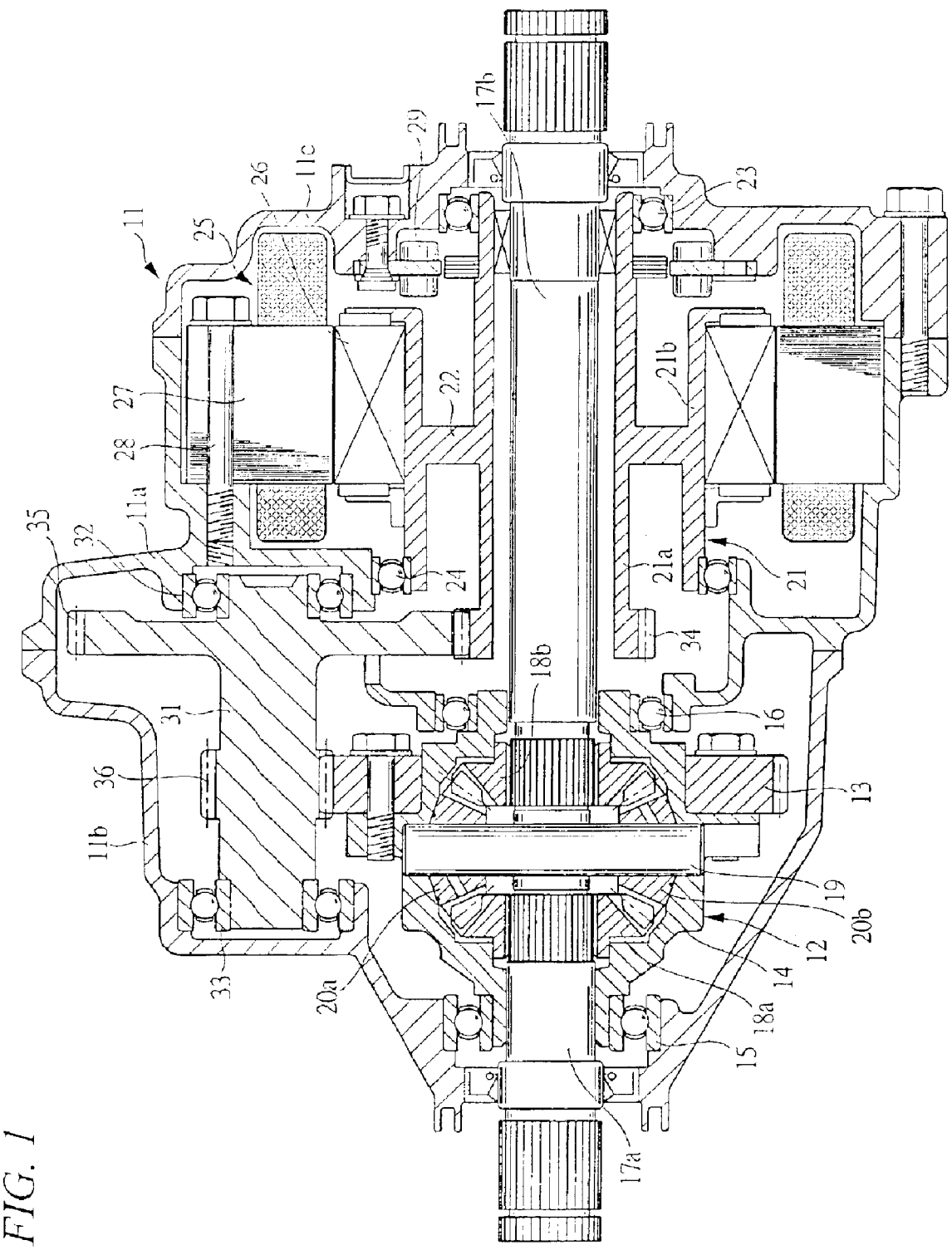
FIG. 1 is a cross-sectional view showing a driving apparatus for vehicle according to one embodiment of the present invention.
Figure 2A:
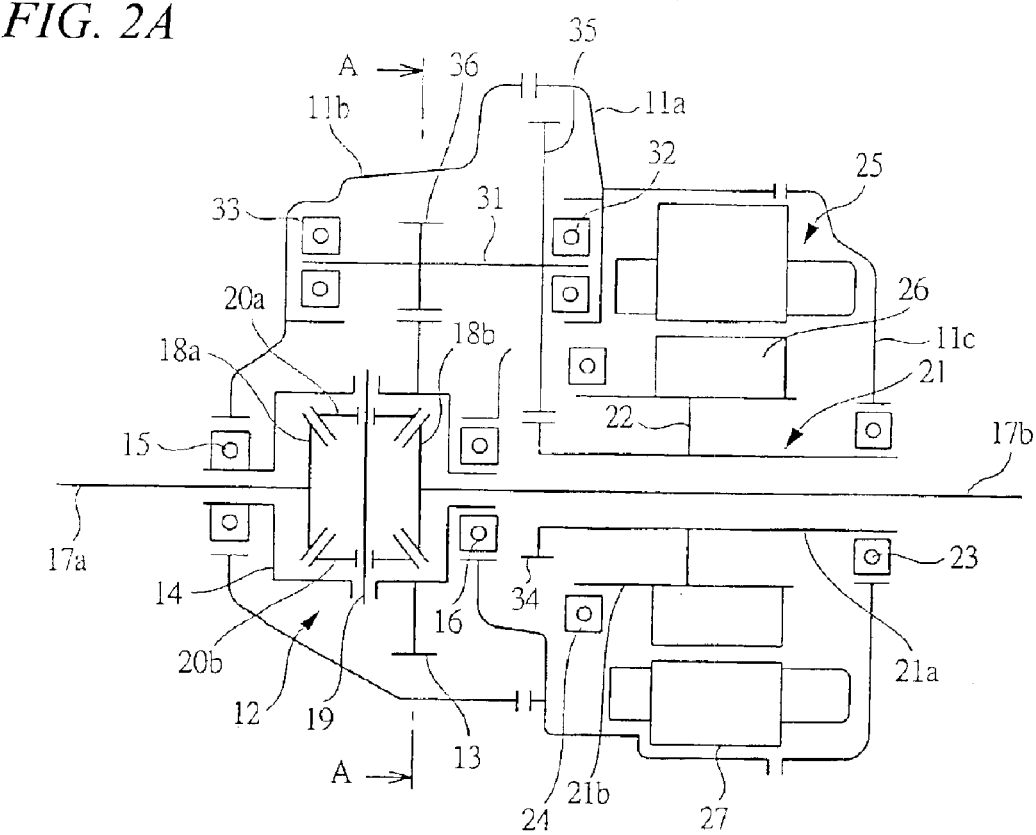
FIG. 2A is a schematic view of the driving apparatus shown in FIG. 1.
Figure 2B:
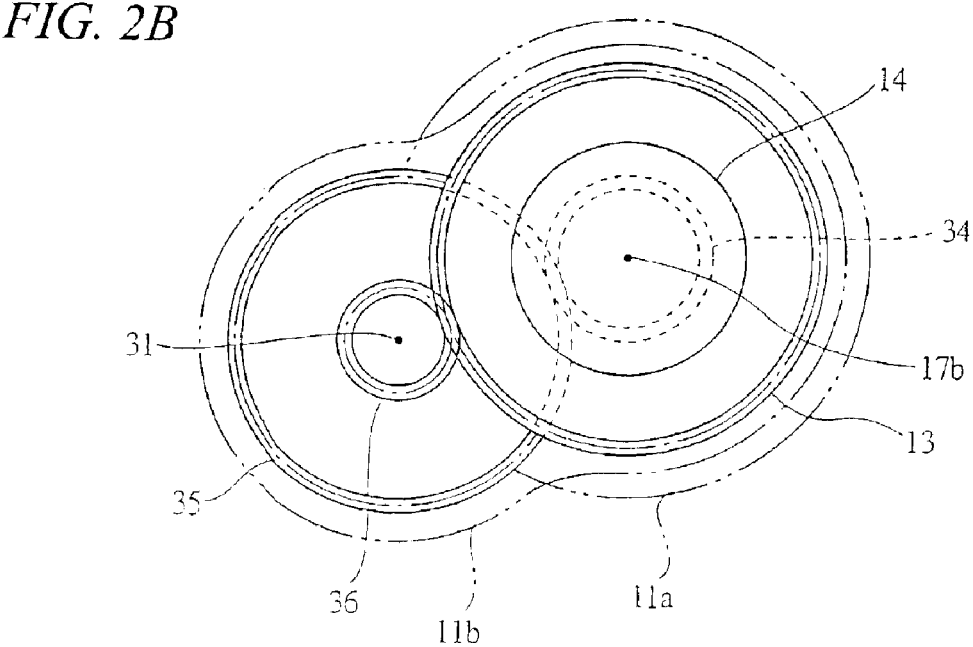
FIG. 2B is a cross-sectional view taken along the A—A line in FIG. 2A.

As shown in FIGS. 1, 2A and 2B, this driving apparatus has a unit case 11 comprising: a motor case 11a; a gear case 11b fixed to one side thereof; and a cover 11c fixed to the other side thereof, and this unit case 11 is mounted in the vehicle. A differential gear unit 12 is rotatably incorporated in the gear case 11b and has a differential case 14 provided with a reduction driven gear 13. The differential case 14 can be rotated by a ball bearing 15 incorporated in the gear case 11b and a ball bearing 16 incorporated in the motor case 11a.

In the differential case 14, there are rotatably incorporated: a bevel gear, that is, a side gear 18a fixed to an axle shaft 17a coupled to one of the left and right drive wheels through a not-shown drive shaft; and a side gear 18b fixed to an axle shaft 17b coupled to the other of the drive wheels through a not-shown drive shaft. These side gears 18a and 18b are located opposite to each other. In the differential case 14, a pinion shaft 19 is fixed in a direction perpendicular to each rotational center axis of the axle shafts 17a and 17b. On the pinion shaft 19, bevel pinions, that is, pinion gears 20a and 20b facing each other and respectively engaged with the side gears 18a and 18b are rotatably mounted.

A hollow rotor shaft 21 is rotatably incorporated outside one of the axle shafts (17a, 17b, herein 17b) so as to be coaxial therewith, and the rotor shaft 21 has an inner hollow shaft 21a, and an outer hollow shaft 21b that is integrally formed with it through a radial direction section 22 (flange) and has a larger diameter than the inner hollow shaft 21a. By thus forming the rotor shaft 21 using the inner and outer hollow shafts 21a and 21b, reduction in weight of the rotor shaft 21 can be achieved. Ball bearings 23 and 24 are incorporated into the motor case 11a, and the ball bearing 23 supports the inner hollow shaft 21a, and the ball bearing 24 supports the outer hollow shaft 21b.

Outside the rotor shaft 21, an electric motor 25 is disposed. The electric motor 25 is a permanent magnet type synchronous motor, which has: a rotor 26 provided with a plurality of permanent magnets corresponding to the number of poles and fixed to the rotor shaft 21; and a stator 27 whose a coil portion is incorporated in a slot of a core surrounding the outer circumference of the rotor 26. The stator 27 is fixed to the motor case 11a with bolts 28. In order to detect a position of magnetic pole of the rotor 26 from rotation of the rotor shaft 21, a resolver 29 is fixed to the motor case 11a. The rotor 26 is thus fixed to the outer hollow shaft 21b of the rotor shaft 21 formed by the inner and outer hollow shafts, thereby allowing for transmitting high torque from the rotor 26 to the rotor shaft 21.

A reduction shaft 31 is rotatably mounted in the unit case 11, and one end of the reduction shaft 31 is supported through a ball bearing 32 by the motor case 11a, and the other end is supported through a ball bearing 33 by the gear case 11b. This reduction shaft 31 is provided with a driven gear 35, which is engaged with a drive gear 34 provided in the inner hollow shaft 21a of the rotor shaft 21. The diameter of the driven gear 35 is set to be larger than that of the drive gear 34, and these gears 34 and 35 constitute a first reduction gear train. The reduction shaft 31 is further provided with a final reduction drive gear 36 engaged with the final reduction driven gear 13 of the differential gear unit 12, and these reduction gears 13 and 36 constitute a second reduction gear train.

Thus, in the driving apparatus of the present invention, the axle shaft 17b is incorporated in the hollow rotor shaft 21, so that the rotor shaft 21 is coaxial with the axle shaft 17b and the reduction shaft 31 is disposed in parallel to the axle shaft 17b. By doing so, the driving apparatus is formed into the two-shaft structure of the rotor shaft 21 and the reduction shaft 31, whereby its size of the width direction is reduced and the in-vehicle performance is improved. Further, six ball bearings are providing in the driving apparatus, thereby allowing for supporting rotating members and simplifying its structure and reducing the manufacturing cost of the driving apparatus.

Figure 3:
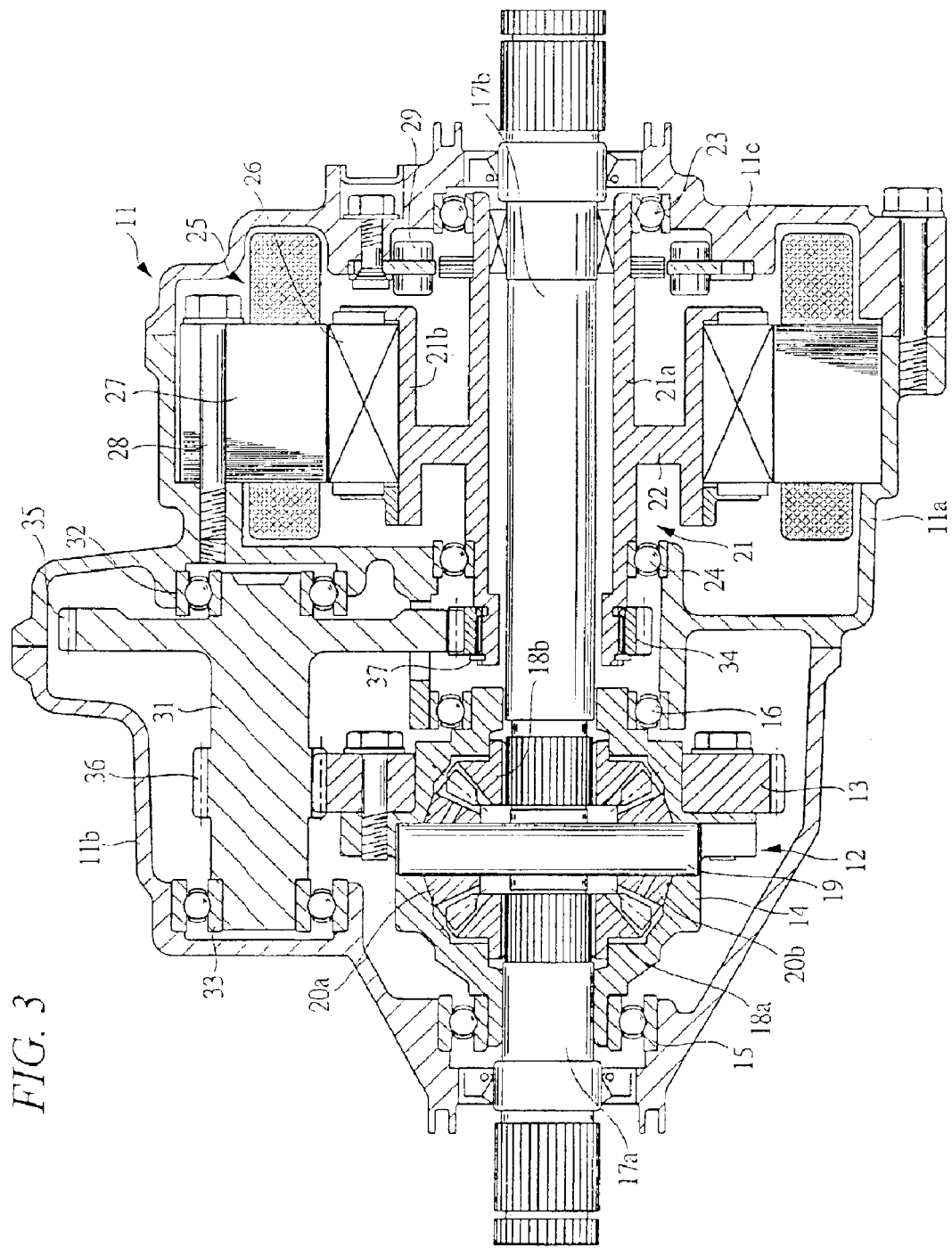
FIG. 3 is a cross-sectional view showing a driving apparatus for vehicle according to another embodiment of the present invention.

FIG. 3 is a cross-sectional view showing a driving apparatus for vehicle according to another embodiment of the present invention. In FIG. 3, the same reference numerals are denoted by the same members as those shown in FIG. 1. In this driving apparatus, the two ball bearings 23 and 24 supporting the rotor shaft 21 are fitted into the inner hollow shaft 21a, respectively. Therefore, the ball bearing 24 has a smaller diameter than one shown in FIG. 1, whereby the rotor shaft 21 becomes smaller in rotational resistance than one of the driving apparatus shown in FIG. 1 and the maximum speed of the rotor shaft 21 can be increased. Although the drive gear 34 shown in FIG. 1 is formed integrally with the inner hollow shaft 21a of the rotor shaft 21, moreover, the drive gear 34 shown in FIG. 3 is formed separately from the rotor shaft 21 and is spline-coupled to the inner hollow shaft 21a and is secured to the inner hollow shaft 21a by a snap ring 37. This driving apparatus is also formed into the two-shaft structure of the rotor shaft 21 and the reduction shaft 31, whereby the size of the width direction thereof is reduced and the in-vehicle performance is improved. Additionally, the six ball bearings are provided to the driving apparatus, thereby allowing for supporting the rotating members and simplifying the structure and reducing the manufacturing cost of the driving apparatus.

Figure 4:
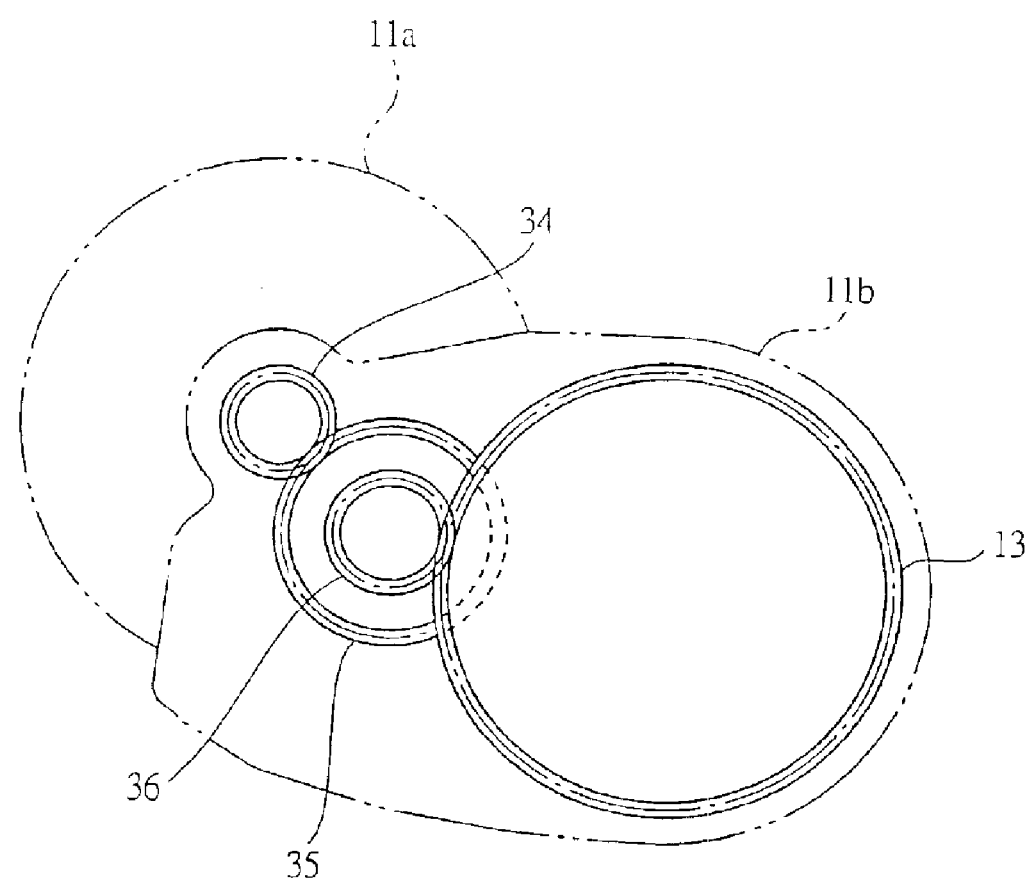
FIG. 4 is a schematic view showing a driving apparatus for vehicle, which has a three-shaft structure, as a comparative example.

FIG. 4 is a schematic view showing a driving apparatus having a three-shaft structure as a comparative example. In the case of the three-shaft structure, the rotor shaft provided with the drive gear 34, the reduction shaft provided with the driven gear 35 engaged with the drive gear 34, and the axle shaft of the differential gear unit, which has the reduction driven gear 13, are disposed in parallel to one another. Of the unit cases, the motor case 11a for accommodating the electric motor and the gear case 11b for accommodating the differential gear unit are shifted in a radial direction, so that the size of the width direction of the driving apparatus is increased. In contrast, since the driving apparatus of the present invention has the two-shaft structure, the size of the width direction of the driving apparatus becomes shortened and the structure thereof can be simplified.

The present invention is not limited to the above-described embodiments and can variously be modified and changed without departing from the gist thereof. For example, the driving apparatus for vehicle according to the present invention can be applied as one for an electric vehicle or hybrid vehicle and applied to not only the case of driving front wheels but also the case of driving rear wheels.

The entire disclosure of a Japanese Patent Application No. 2002-117076, filed on Apr. 19, 2002 including specification, claims, drawings and summary, on which the Convention priority of the present application is based, are incorporated herein by reference in its entirety.

What is claimed is:

1. A driving apparatus for a vehicle employing an electric motor as a driving source, comprising:
   a differential gear unit including a differential case provided with a final reduction driven gear, and two axle shafts respectively coupled to drive wheels;
   the electric motor including a rotor fixed to a hollow rotor shaft that is coaxially disposed outside one of said axle shafts; and
   a reduction shaft disposed in parallel to said axle shafts, and provided with a driven gear that is engaged with a drive gear fixed to said rotor shaft and with a final reduction drive gear that is engaged with said final reduction driven gear.

2. The apparatus according to claim 1, wherein each of said differential case, said rotor shaft and said reduction shaft is rotatably supported through two bearings in a unit case.

3. The apparatus according to claim 1, wherein said rotor shaft includes: an inner hollow shaft provided with said drive gear; and an outer hollow shaft on which said rotor is mounted and that is formed integrally with said inner hollow shaft through a flange protruding outward and radially from the inner hollow shaft.

4. The apparatus according to claim 3, wherein the two bearings, supporting said rotor shaft, support said inner hollow shaft.

5. The apparatus according to claim 3, wherein one of the two bearings, supporting said rotor shaft, supports said inner hollow shaft, and the other supports said outer hollow shaft.

6. The apparatus according to claim 3, wherein said drive gear is spline-coupled onto said inner hollow shaft.

7. The apparatus according to claim 3, wherein said drive gear is formed integrally with said inner hollow shaft.

* * * * *